Jan. 15, 1957  S. B. WILLIAMS  2,777,649
FLUID SUSTAINED AIRCRAFT
Filed Aug. 13, 1952  6 Sheets-Sheet 1
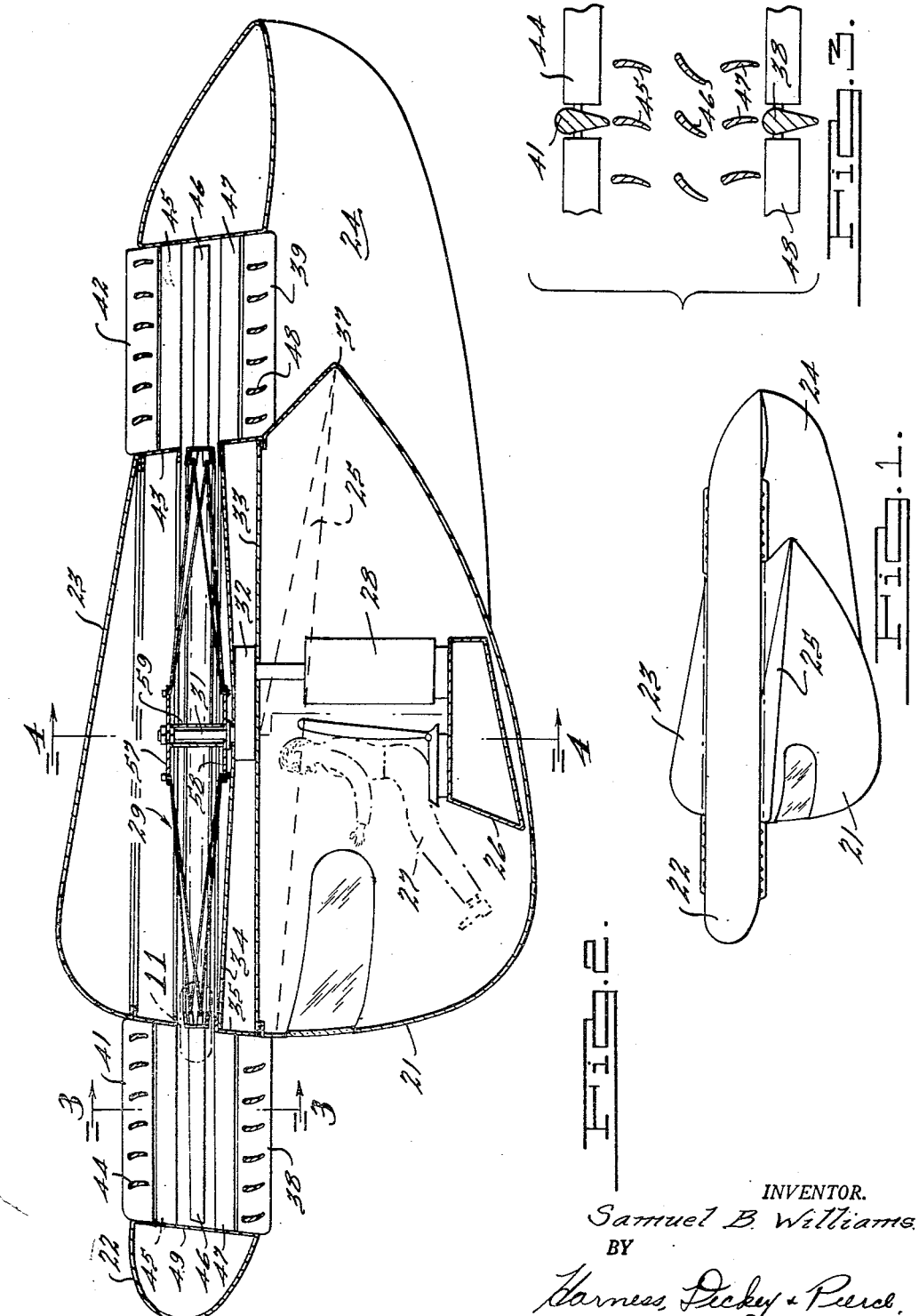
INVENTOR.
Samuel B. Williams
BY
Harness, Dickey & Pierce
ATTORNEYS.

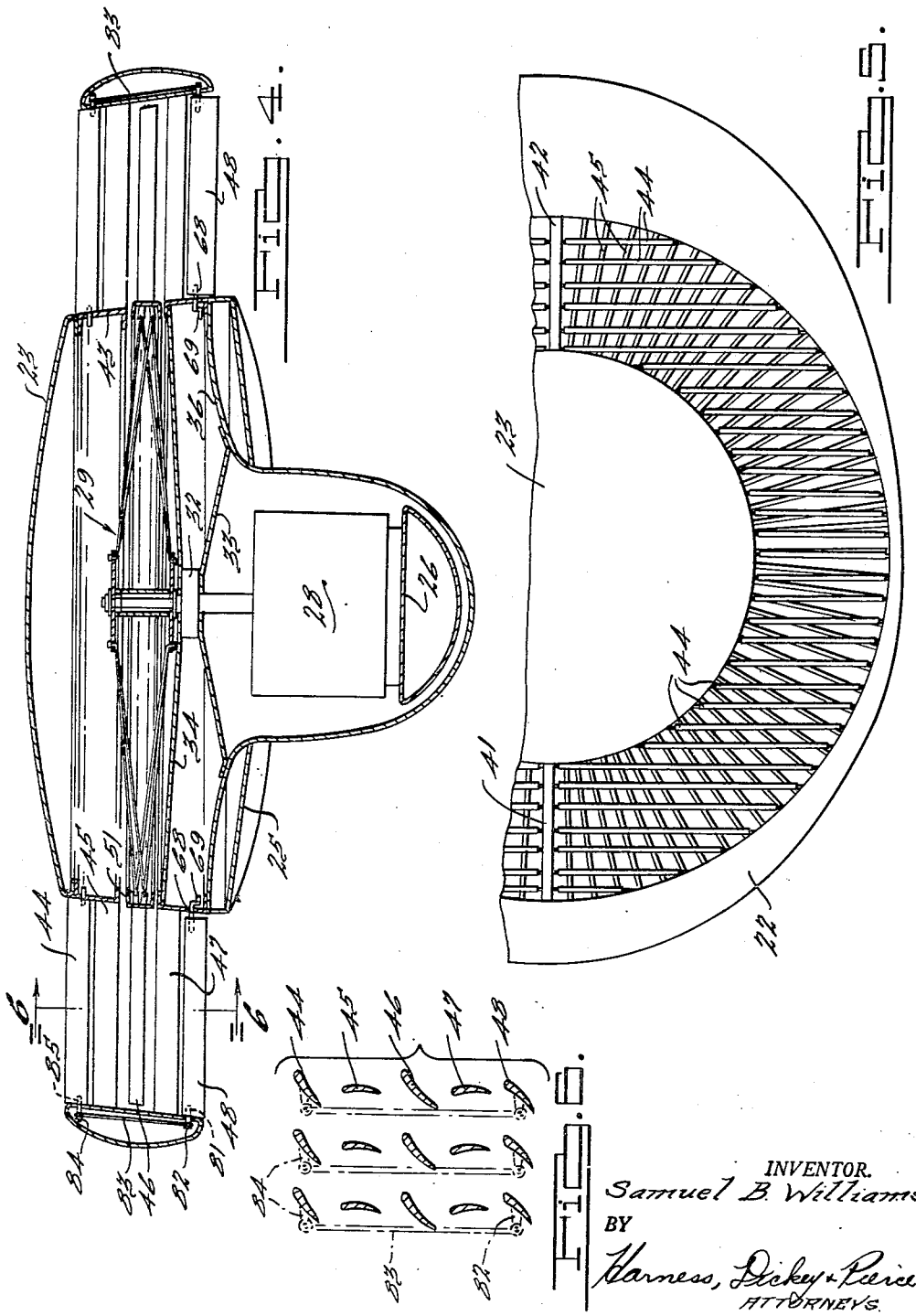

Jan. 15, 1957  S. B. WILLIAMS  2,777,649
FLUID SUSTAINED AIRCRAFT
Filed Aug. 13, 1952  6 Sheets-Sheet 3

INVENTOR.
Samuel B. Williams.
BY
Harness, Dickey & Pierce.
ATTORNEYS

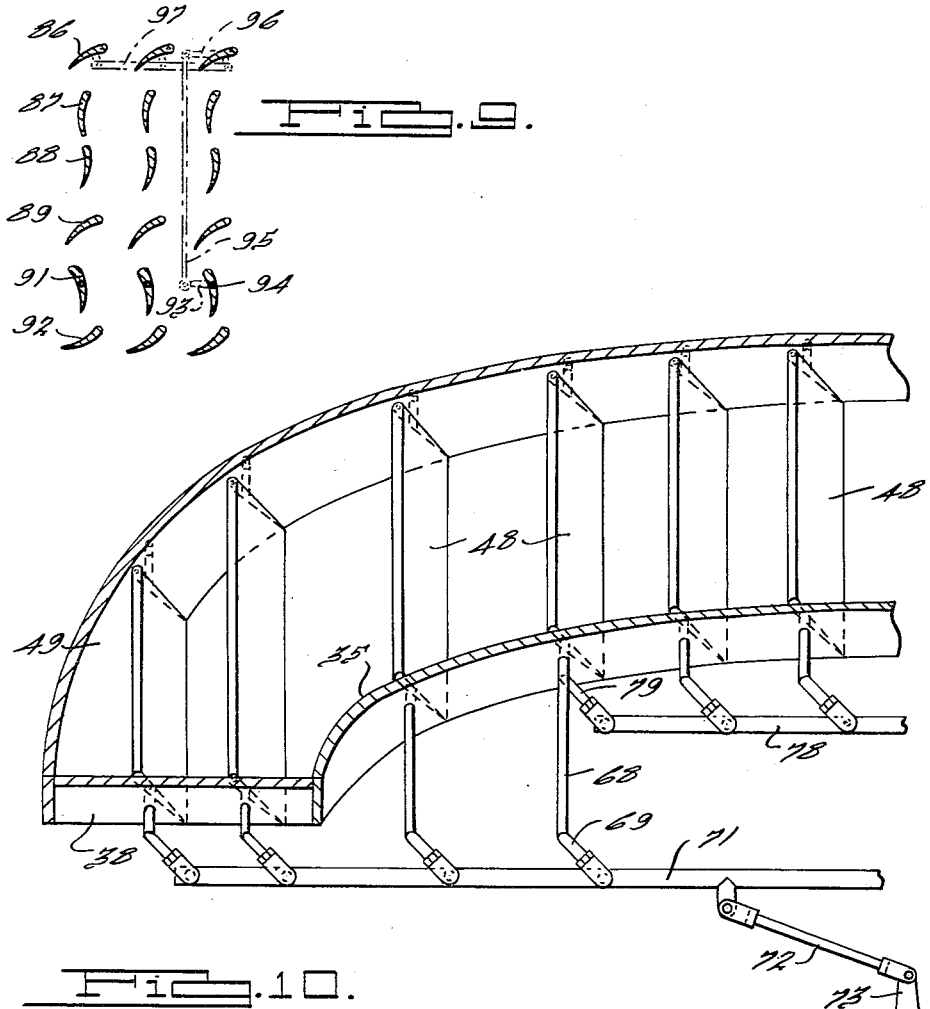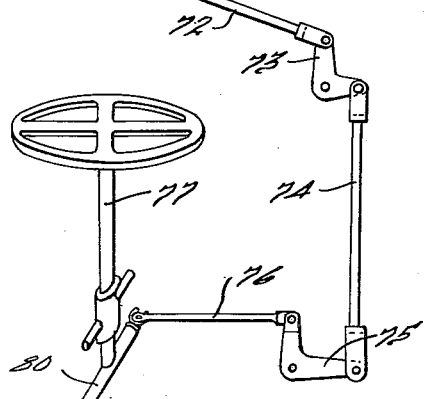

INVENTOR.
*Samuel B. Williams*
BY
*Harness, Dickey & Pierce.*
ATTORNEYS

Jan. 15, 1957  S. B. WILLIAMS  2,777,649
FLUID SUSTAINED AIRCRAFT
Filed Aug. 13, 1952  6 Sheets-Sheet 6
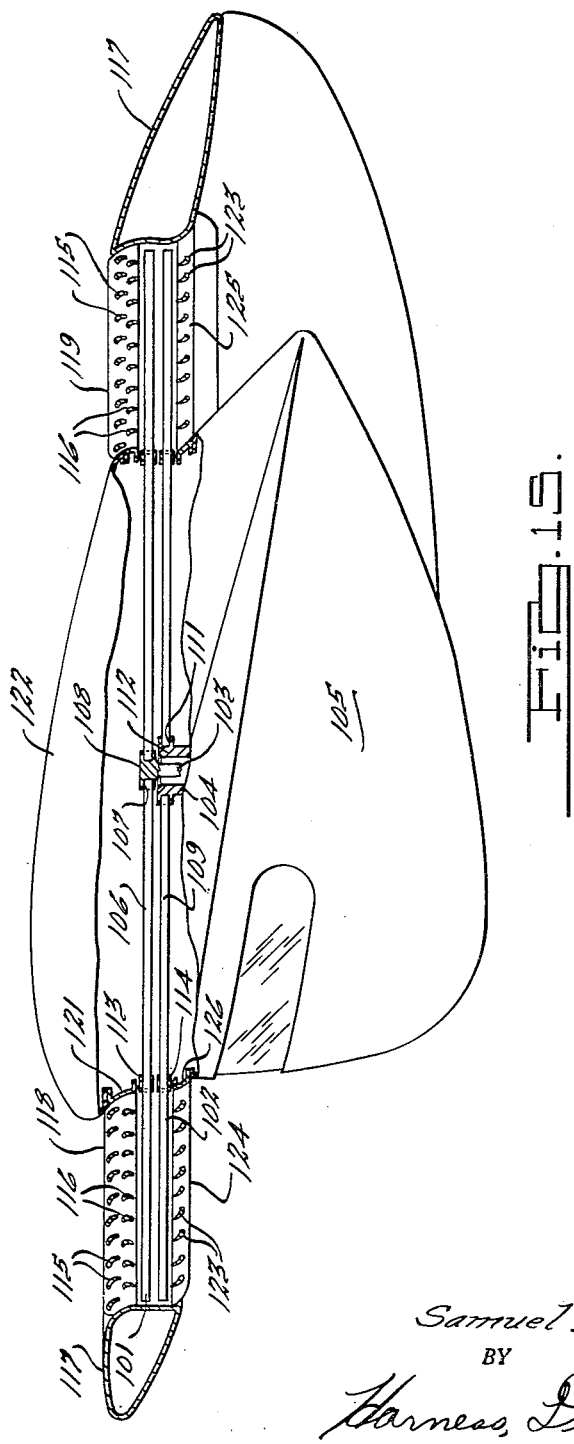
INVENTOR.
Samuel B. Williams
BY
Harness, Dickey & Pierce
ATTORNEYS

United States Patent Office

2,777,649
Patented Jan. 15, 1957

2,777,649

FLUID SUSTAINED AIRCRAFT

Samuel B. Williams, Birmingham, Mich.

Application August 13, 1952, Serial No. 304,135

5 Claims. (Cl. 244—23)

This invention relates to helicopters, and more particularly to the lifting, propelling and flight controlling mechanisms of helicopters and similar aircraft.

The conventional types of helicopters have several inherent disadvantages which make their cost of construction relatively high and increase the complexity of the lifting, propelling and flight controlling mechanisms of these aircraft. One of the main disadvantages of conventional helicopters is that the air discharging from the main rotors possesses a swirl or tangential velocity component which results in a torque applied to the craft, which must be counteracted by forces developed in an auxiliary rotor propeller. The energy used to apply this counter-torque does not contribute to the lifting or propelling of the aircraft, and the necessity of providing such a counter-torque device increases the cost of construction. Another source of difficulty in present-day helicopters is the instability which results from the different relative velocities on the advancing and receding sides of the rotor during forward flight. Since the velocity of the entering air relative to the blades of the advancing side of the rotor is greater than the relative velocity on the blades on the receding side, there is created a difference in lifting forces on the two sides of the craft. Although it has been proposed to remedy this instability characteristic by providing blades which cyclically change their pitch, such blade flapping mechanisms are expensive, complex and a constant source of trouble.

A third difficulty with conventional helicopter constructions is the speed and direction control mechanisms which usually includes tilting the rotor in the flight direction or impressing cyclical variations in the blade pitch angle. Here again this involves a complex mechanism and such control principles are inherently inefficient.

It is an object of the present invention to eliminate the above mentioned disadvantages of present-day helicopter constructions and to provide a novel and improved construction for the lifting, propelling and flight controlling components of helicopter aircraft.

It is another object of the invention to provide an improved helicopter construction including means for producing a discharge flow having no swirl component, thus eliminating the necessity of a separate counter-torque device for maintaining a steady course. More particularly, it is an object to provide a helicopter having a set of stationary blades below the rotor blades which direct the air flow into an axial direction, thus eliminating the tangential component of flow.

It is a further object to provide a helicopter which eliminates the instability factor due to the difference in relative velocities on the two sides of the rotor, without the necessity of providing variable pitch rotor blades.

It is also an object of the invention to provide an improved system of rotating and stationary radially disposed blades for efficiently pumping the main air stream while imparting no tangential velocity component to the departing stream. In particular, the invention contemplates the use of a rotor having an inside or rim diameter which is relatively large with respect to the outside diameter. It is also an object to provide a rotor of high solidity, that is with closely spaced blades, a stationary set of radially disposed blades above the rotor to direct air into the rotor blades at the proper angle for optimum blade efficiency, and a set of stationary radially disposed blades below the rotor for redirecting the air to axial flow, thus fully utilizing its total flow energy for lifting purposes. The arrangement further contemplates the use of a stationary shroud surrounding the rotor to reduce blade tip losses.

It is a further object to provide a novel and improved means for controlling the direction of flight without the necessity of tilting the rotor in the direction of flight or providing variable pitch rotor blades. In this connection, the invention contemplates the use of a set of parallel variable pitch blades below the rotor blades and transversely disposed, the pitch angle of these control blades, with respect to the air flow from the rotor, determining the direction of flight of the craft.

It is also an object to provide a helicopter having improved means for directing air approaching the rotor in an axial direction so as to increase the efficiency of the pump action. In connection with this object, the invention contemplates the provision of a set of blades disposed normal to the line of flight above the rotor, for directing the oncoming air in a downward axial direction.

It is another object to provide an improved helicopter construction in which the air flowing through the blade system has a small but definite outward radial velocity component, thus providing an additional stabilizing influence tending to maintain the craft on an even keel.

Other objects, features, and advantages of the present invention will become apparent from the subsequent description, taken in conjunction with the accompanying drawings.

In the drawings:

Figure 1 is a general side elevational view of the helicopter of my invention;

Figure 2 is a side cross-sectional view of a preferred form of the helicopter, having a single set of upper transversely disposed blades;

Figure 3 is a fragmentary cross-sectional view taken along the line 3—3 of Figure 2 and showing the disposition of the stationary and rotor blades;

Figure 4 is a front cross-sectional view taken along the line 4—4 of Figure 1 and showing one form of control linkage for simultaneously moving the upper and lower sets of parallel blades;

Figure 5 is a fragmentary top plan view of the helicopter, showing the radially disposed and transversely disposed blades;

Figure 6 is a fragmentary cross-sectional view taken along the line 6—6 of Figure 4 and showing the disposition of the blades on the side of the helicopter;

Figure 9 is a cross-sectional view taken along the line 9—9 of Figure 8 and showing further details of the control linkage;

Figure 10 is a partially schematic perspective view of the portion of the control linkage leading from the pilot's control;

Figure 15 is a side elevational view in cross section of still another embodiment of the invention using counter-rotating rotors.

Figure 7:
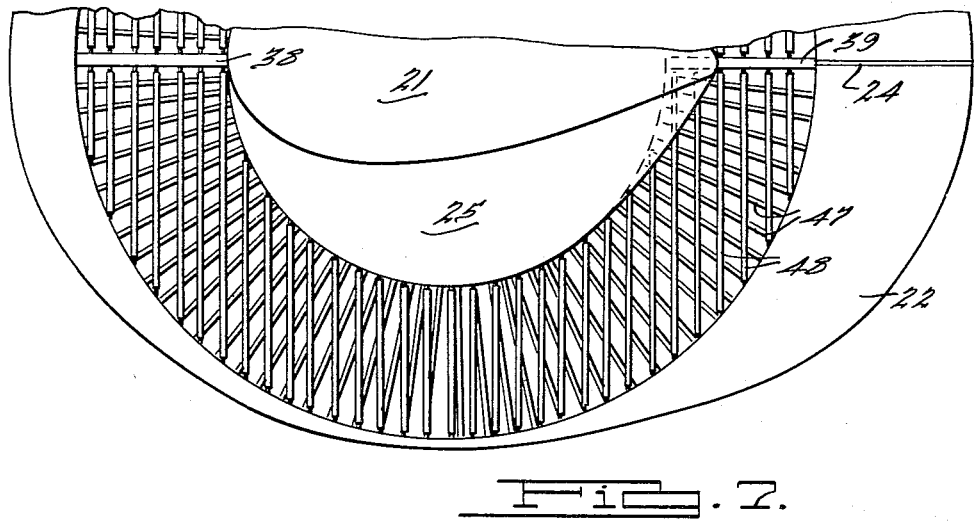
Figure 7 is a fragmentary bottom plan view of the helicopter, showing the contour of the passenger compartment and of the fairing.

The general configuration of the helicopter is shown best in Figures 1 and 4. The craft comprises a cabin portion 21 which holds the passengers and supports the rotor and its drive means, an annular shroud portion 22 of airfoil shape surrounding the rotor and supporting the various sets of blades, and a dome 23 which is disposed above the cabin portion and centrally located with respect to the rotor. The rear portion of the shroud is supported by a rear strut 24 of streamlined cross section, and the cabin portion has a pair of fairings 25 extending outwardly therefrom on opopsite sides which serve as an additional stabilizing and streamlining surface.

The cabin 21 is of generally streamlined shape, having a rounded bottom portion, with a support 26 interiorly thereof for the pilot 27 and the rotor driving means, which is schematically shown at 28. The rotor, generally indicated at 29, has a vertical shaft 31 which is driven from driving means 28 through reduction gearing 32. The cabin is provided with a roof plate 33 above which the gear reduction unit is disposed, and an upper plate 34 is spaced above plate 33 and is substantially parallel thereto, these plates being connected by an annular lower inner shroud 35. The upper portion of cabin 21 is flared outwardly at its sides as shown at 36 in Figure 4, and the lower inner shroud 35 serves to connect the outwardly flared upper edge of the cabin portion with plate 34, roof plate 33 being connected to the lower inner shroud member at its front and rear edges, and to the cabin wall at its side edges. The fairings 25 are preferably hollow in nature and extend downwardly and rearwardly from the undersurface of cabin portions 36, the vanes being tapered toward the rear and terminating at the rear edge 37 of the cabin.

The outer shroud 22 is also preferably hollow in nature and has an airfoil shape in the fore-and-aft direction, with the intermediate portion of said airfoil replaced by the blade grids. This outer shroud is connected to the lower inner shroud member 35 by a front strut 38 and a rear strut 39 which are longitudinally positioned on the axis of the craft. The upper corner of shroud 22 has a set of longitudinal upper struts 41 and 42 connected thereto above struts 38 and 39 respectively. These struts extend inwardly and support an upper inner shroud member 43 above lower inner shroud member 35, and which like the latter is of substantially channel-shaped cross-section. The upper inner shroud member 43 serves to support the dome 23 of the craft, this dome being likewise of streamlined shape. As will be later seen, struts 38 and 39 serve to pivotally support the lower set of transverse blades, whereas the upper struts 41 and 42 serve to support the upper set of transverse blades.

Referring now more particularly to the blade construction and arrangement, the helicopter is equipped with a set of upper parallel blades 44 disposed transversely to the line of flight, a set of upper radially disposed blades 45, rotor blades 46, lower radially disposed blades 47, and lower transverse parallel blades 48. These blade sets have been thus indicated in numerical succession corresponding to the successive flow of air through the blades. As will be seen later, however, the number of sets of blades is merely illustrative, and for instance two sets of upper transverse blades could be used if desired. The lengths of blades 45, 46 and 47 are all approximately equal and are about equal to the lengths of struts 38, 39, 41 and 42. The inner wall 49 of shroud 22 is slanted slightly outwardly and downwardly, and the corresponding blade supporting surfaces on the lower inner and upper inner shroud members 35 and 43 are also slanted downwardly and outwardly, as seen in Figure 2, so that the air passing through the blade sets has a slight radially outward component. The inside or rim diameter of the rotor is relatively close to the outside diameter, and the blade sets are preferably closely spaced, that is, there are a relatively large number of blades in each set, giving a high solidity factor to the blade sets.

The arrangement of the upper transverse blades 44 is shown best in Figure 5. These blades are divided into port and starboard sets, the forwardmost blades being pivotally supported between the strut 41 and the inner wall 49 of shroud member 22, the intermediate blades pivotally supported between the upper inner shroud member 43 and outer shroud member 22, and the rearmost pivotally supported between rear strut 42 and shroud member 22. The blades 44, like the other sets of blades, are of airfoil cross-section, and are adapted to direct air flowing above the helicopter in a downward direction. The control means for changing the pitch of blades 44 will be described later.

Upper radial blades 45 are stationary and are connected between upper inner shroud member 43 and inner wall 49 of outer shroud member 22. These blades are also of airfoil shape and serve to turn the air passing through blades 44, providing a moderate tangential flow component in a direction opposite to the direction of rotor rotation. The resulting aerodynamic loading on these blades introduces a torque reaction into the static structure of the aircraft which opposes the rotor torque. In addition, this turning action reduces the amount of air turning required by the subsequently described stationary radial blades located below the rotor.

Rotor blades 46 are secured at their inner ends to rim 51 of rotor 29 disposed between shroud members 43 and 35, and the outer edges of the blades are spaced slightly inwardly of inner wall 49 of outer shroud 22. The blades 46 have a fixed pitch angle and serve to impart a pumping action to the air delivered to them by blades 45, so as to impart the lifting and propelling forces to the helicopter.

Blades 47 are disposed below blades 46 and, like blades 45, are radially disposed. These blades are stationary and are secured between lower inner shroud member 35 and wall 49 of shroud member 22. The purpose of blades 47 is to remove the tangential component of velocity imparted to the air leaving rotor blades 46, and for this purpose their airfoil shape is opposed to that of the rotor blades. This, of course, means that the total velocity of the air will be used as a lifting and propelling force on the helicopter, except for the slight radially outward velocity component described previously which has a stabilizing effect. As in the case of blades 45, the aerodynamic load on these blades is in a direction opposite to the rotor torque direction; hence a torque balancing reaction is introduced.

Blades 48 are transversely disposed and divided into port and starboard sets, similar to blades 44, but are adapted to be moved in such a manner as to direct the air downwardly and rearwardly. The forwardmost of these blades are pivoted at one end to lower forward strut 38, the intermediate blades to lower inner shroud member 35, and the rear blades to lower rear strut 39, the opposite ends of these blades all being pivotally supported by inner wall 49 of outer shroud member 42.

Various means may be provided for securing rotor blades 46 to the rotor rim 51, and these constructions are shown in Figures 11 to 14. The rim 51 serves to space the rotor blades, which are provided with base portions 52 having extensions 53 thereon. Base portions 52 are preferably secured within those ends of the hollow blades which abut the web portion 54 of rim 51. This web portion has a plurality of openings 55 therein to allow extensions 53 to pass therethrough. A plurality of wire spokes 56 are secured between extensions 53 and upper and lower hub plates 57 and 58 which are attached to rotor shaft 31, these plates being spaced by a collar 59. In an alternative method of construction shown in Figure 14, the attaching member 61 inserted in one end of blade 46 is secured to web portion 62 of rim 63 by a bolt and nut 64, and the rim itself is secured to the hub plates by spokes 65 which engage buttons 66 on flange portions 67 of the rim.

Means are provided for controlling the pivoting movement of upper transverse blades 44 and lower transverse blades 48. It will be understood that during normal operation of the craft, the blade sets 44 and 48 will be tilted substantially in the directions shown in Figure 6, that is, the leading edges of blades 44 will be pivoted forwardly to receive the incoming air, and the trailing edges of blades 48 will be tilted rearwardly to direct the air downwardly and rearwardly. Figures 4 and 6 show a portion of one type of control linkage which may be used, in which the upper blades 44 are controlled coincidentally with lower blades 48. In this construction the pivot 68 of blades 48 on each side of the craft are provided with a crank arm 69, this crank arm being connected to a control rod 71 as shown schematically in Figure 10. By means of intermediate links and bell cranks 72, 73, 74, 75 and 76, the control rod 71 can be actuated by movement of a rotatable and rockable pilot control stick 77. Since the stick 77 is normally toward the forward end of the craft, control of the blades to the rear of the craft may be had by an additional control rod 78 pivotally connected to an additional crank arm 79 on one of the blade pivots. Crossarm 80 on the pilot control stick is connected at its opposite ends to symmetrical linkages for the port and starboard sets of blades, although only the starboard linkage is shown. The outer pivot 81 of each blade 48 is provided with a crank arm 82, and a link 83 connects this crank arm to crank arm 84 on pivot 85 of a corresponding blade 44. Blades 44 will thus move in unison with blades 48.

Figure 8:
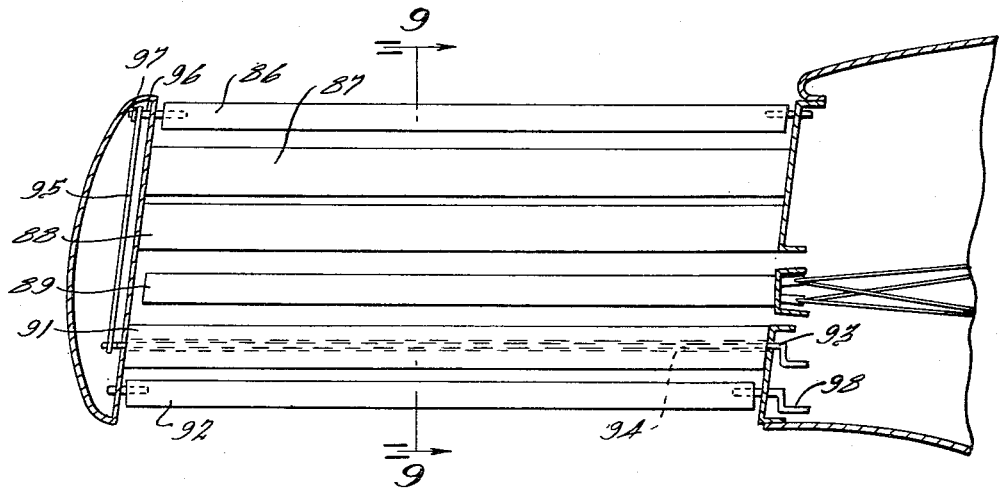
Figure 8 is an enlarged fragmentary view in the same plane as Figure 4 but showing an alternate construction having two sets of upper transverse blades, one set being movable, and showing a control linkage for controlling the upper and lower transverse blades separately.
Figure 11:
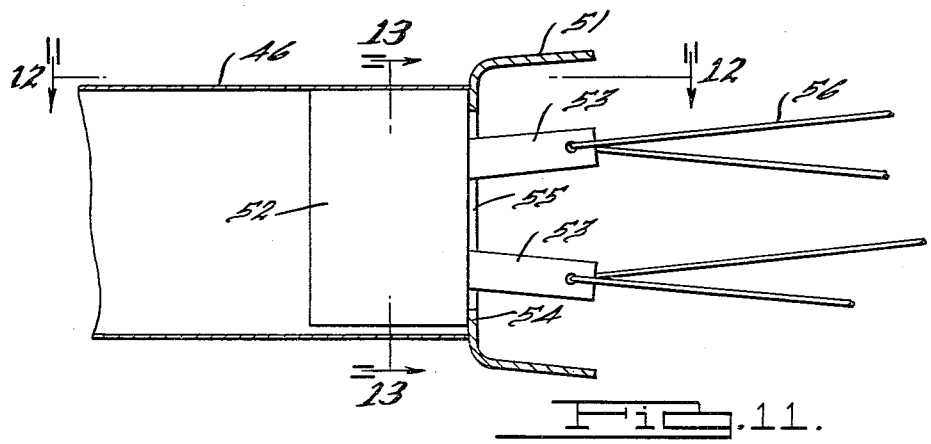
Figure 11 is an enlarged fragmentary view of the portion marked "11" in Figure 2 showing the mounting means for the rotor blades.
Figures 12, 13:
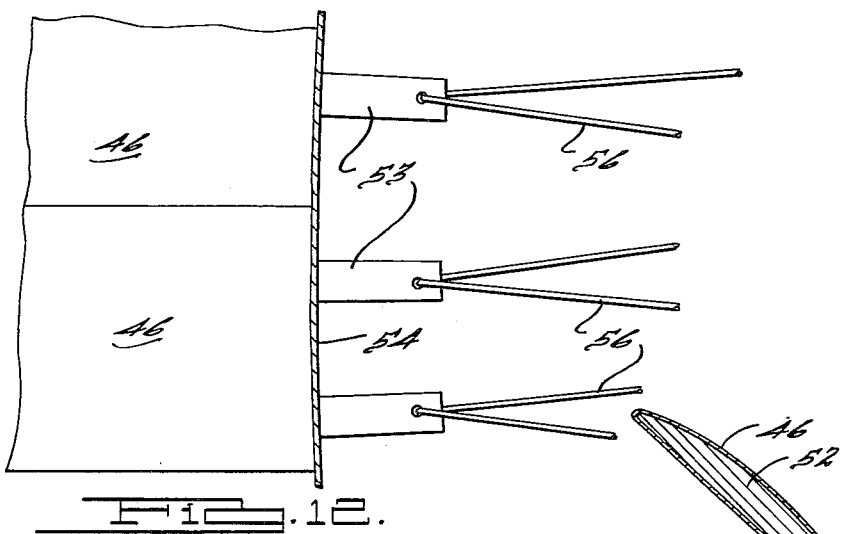
Figure 12 is a sectional view taken along the line 12—12 of Figure 11 and showing the connection of the wire struts to the rotor blade ends.
Figure 13 is a cross-sectional view taken along the line 13—13 of Figure 11 and showing the configuration of the rotor blades and their attaching base.
Figure 14:
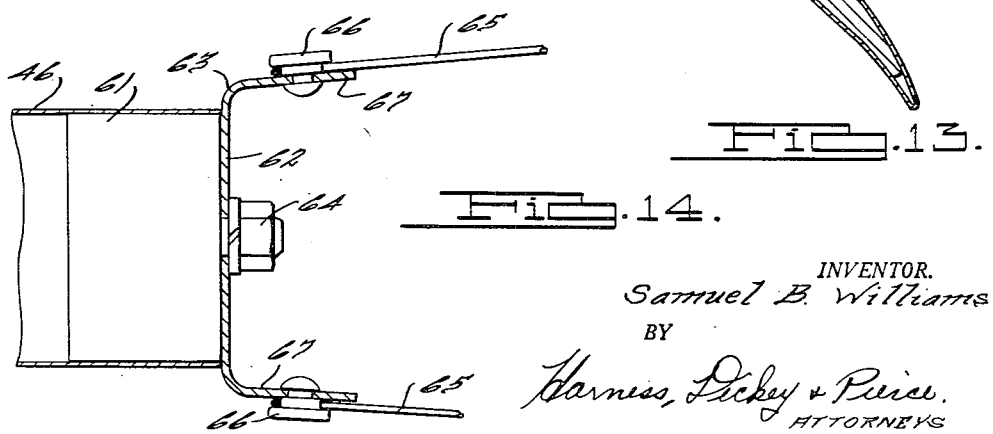
Figure 14 is a view of a modified form of mounting the rotor blades.

Figures 8 and 9 illustrate a modification of the invention in which there are two sets of upper transverse parallel blades, and in which the upper and lower movable blades are separately controllable. In this embodiment the craft is provided with an upper set of transverse blades 86 which are pivotally mounted, a set of stationary transverse blades 87 below blades 86, a set of stationary radial blades 88 similar to blades 45 in the first embodiment, rotor blades 89, a lower set of radial stationary blades 91 similar to blades 47 of the first embodiment, and lower pivotally mounted transverse blades 92 similar to blades 48 of the first embodiment. The presence of additional stationary transverse blades 87, augmenting the action of blades 86, serves to increase the efficiency of the process of turning the entering air to a direction parallel to the rotor axis. In this embodiment, the upper transverse blades 86 are controlled by a crankshaft 93 passing through an opening 94 in one of the stationary radial blades 91 on each side of the craft. Crankshaft 93 is connected by a link 95 to a crank arm 96 on one of the pivoted blades 86, and this crank arm may be connected by rods 97 to other blades of the set. The lower pivoted transverse blades 92 on the other hand are provided with cranks 98 and therefore may be controlled by a separate control linkage. The linkages for controlling the blades may be similar to that shown in Figure 10.

In operation, the craft will either be in a hovering position, moving forward or turning. When in the hovering position the blades 44 and 48 will be tilted so as to have the minimum angle of attack, since it is not necessary to scoop air into the blade system and there should be no horizontal velocity component as the air leaves the blades. It will be noted that when in this position the air will have a small but definite outwardly flaring movement as it leaves the blade system. This will maintain the craft in stable equilibrium, since any tilting of the craft will cause that end of the craft which is tilted downwardly to have more of an upward reaction due to the change in flow direction of the air. When the craft is moving forwardly, the presence of outer shroud 22, because of its airfoil shape, will provide streamlining for the blade grid annulus and additional lift to the aircraft. The air flowing along the top of the craft will be scooped downwardly into the blade system by upper blades 44, the amount of air so redirected depending upon the angle of attack of these blades and the pumping effectiveness. The presence of transverse blades 86 and 87 in the embodiment of Figures 8 and 9 corrects the normal situation in which the relative air velocity on the advancing side of the rotor is greater than the air velocity on the receding side, and thus makes unnecessary the blade flapping or pitch changing mechanisms which have heretofore been used.

After being turned toward a tangential direction by blades 45 and accelerated and turned in the opposite direction by rotor blades 46, the air passes through lower stationary radial blades 47. These blades serve to eliminate the tangential component imparted to the air by rotor blades 46, and thus makes unnecessary the presence of a counter-rotating rotor. The downwardly flowing air then passes through lower transverse blades 48 which, by being tilted downwardly and rearwardly, impart a horizontal component to the air which propels the craft in a forward direction. The amount of forward speed may be controlled by the pitch angle of these blades, and the turning component of the craft may be controlled by the independent actuation of blades 44 and 48 on the port and starboard sides of the craft. Under certain conditions, blades 48 may even be tilted so as to direct air forwardly of the craft, thus providing a braking action or a rearward motion.

Figure 15 illustrates still another embodiment of the invention in which a pair of counter-rotating rotors are utilized in conjunction with the upper and lower normally disposed blades of the previous embodiments. As shown, the craft is provided with an upper rotor having radial blades 101 and a lower rotor having blades 102, and these rotors are rotated in opposite directions by shafts 103 and 104 respectively. In the illustrated emodiment shaft 104 is shown as a hollow shaft through which extends shaft 103, these shafts being driven in opposite directions by motor means (not shown) enclosed within cabin 105 shown in dot-dash lines. As illustrated, blades 101 have inner extensions 106 which are secured by welding or other means within slots 107 on hub 108 of inner shaft 103. Similarly, lower blades 102 have extensions 109 which are secured in slots 111 of hub 112 on outer shaft 104. The rotors are supported at intermediate points by supporting rings 113 and 114 having slots through which the blades extend. It will be understood that other securing means for the rotors, such as those shown in the previous embodiments, may be used.

Disposed above the counter-rotating rotors are an upper set of blades 115 and a lower set 116, both of these sets of blades being disposed normal to the flight path and being supported at their outer ends by annular shroud 117. As in the previous embodiments, the inner ends of these blades are supported by an upper forward strut 118, an upper rear strut 119 and upper inner shroud member 121 attached to dome 122. Blades 115 and 116 are shown as being fixed, although either or both of these blade sets could be tiltable if desired. Blade sets 115 and 116 perform in general the same functions as blade sets 86 and 87 in the embodiment of Figures 8 and 9. Below the counter-rotating rotors is another set of blades 123 which are the equivalent of blades 92 in the embodiment of Figures 8 and 9, and like the latter set of blades are tiltable (by means not shown). Blades 123, which are normal to the flight path, are supported at their outer ends by shroud 117 and at their inner ends by forward strut 124, rear strut 125 and lower inner shroud member 126.

It will be noted that in this arrangement the sets of stationary radial blades are eliminated, since the rotor torques of upper and lower blades 101 and 102 counterbalance each other, so that no tangential component remain in the air flowing downwardly from the lower motor. The advantage of this construction is apparent when it is considered that in conventional designs having coaxial counter-rotating rotors, these rotors must be spaced widely apart in order to permit the blade flapping to occur without interference between the upper and lower sets. Since the need for blade flapping or pitch changing is eliminated in the present arrangement through the use of the normally disposed blades as previously described, this arrangement has the advantage of permitting closer spacing of the rotors. Thus a more stable support of the upper rotor is achieved through elimination of the relatively long extension shaft required to provide the spacing in conventional designs. This arrangement also has the advantage of dividing the power between two rotors, hence permitting the use of greater horsepower in a given size craft without overstressing the rotors. The other advantages pointed out above with respect to the upper and lower normally disposed blades are also retained in this embodiment.

In the embodiments shown, auto-rotation for safe "power-off" gliding descent is achieved by adjustment of the blade angles to permit normal upward airflow through the blade grids.

Augmenting devices such as wing extensions for additional lift, a horizontal stabilizer and rudder, or propellers or jet engines for added forward thrust would not depart from the basic concepts of this invention.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What is claimed is:

1. In a helicopter or the like, a rotor having rotor blades thereon, a set of parallel blades above said rotor blades and normal to the flight path, said last-mentioned blades being adapted to direct air downwardly toward the rotor blades, means for changing the pitch of said parallel blades, and a second set of parallel blades normal to the flight path between said first set of parallel blades and said rotor blades, said second set of parallel blades being of fixed pitch and being adapted to direct air axially toward said rotor blades.

2. In a helicopter or the like, a rotor having rotor blades thereon, a shroud outwardly spaced from and surrounding said rotor blades, said shroud being of streamlined airfoil shape from front to rear and serving to reduce aerodynamic drag in forward flight, upper and lower inner shroud members on opposite sides of said rotor and spaced inwardly from said outer shroud, mutually facing surfaces on said inner and outer shrouds for directing air through said rotor blades, at least one set of vanes located above said rotor joined to said inner upper shroud member and to said outer shroud member, said vanes defining turning passageways for directing the incoming air downwardly to the rotor, a set of stationary radially disposed blades located below said rotor joined to said lower inner shroud member and to said outer shroud member, and a set of parallel blades located below said radially disposed blades and disposed normal to the forward flight direction, said parallel blades being tiltable for controlling the direction of air discharged from the craft.

3. In a helicopter or the like, a fuselage portion, an annular passageway of relatively large inside diameter and short length vertically disposed and located above said fuselage, air pumping and directing means located in said annular passageway for lifting, propelling and controlling the craft in flight, a stationary streamlined shroud forming part of said annular passageway, a streamlined dome surface extending upwardly from the inner upper end of said annulus for reducing aerodynamic drag during forward flight, and a convergent fairing surface comprising part of said fuselage and extending generally downwardly and rearwardly from the lower inner end of said annular passageway.

4. In a helicopter or the like, a rotor having rotor blades thereon, a shroud outwardly spaced from and surrounding said rotor blades, said shroud serving to deflect air from the rotor blade tips, a set of stationary radial blades above said rotor, a set of stationary radial blades below said rotor, said sets of stationary blades being secured to said shroud, a set of parallel blades above said upper stationary blades and disposed normal to the flight path, a set of parallel blades below said lower stationary blades and disposed normal to the flight path, said parallel blades being pivotally supported by said shroud, and means for independently adjusting the pitch angles of said upper and lower parallel blades, said means including a link passing through one of said stationary blades and operatively connected to one set of said parallel blades.

5. In a helicopter or the like, a rotor having rotor blades thereon, a shroud outwardly spaced from and surrounding said rotor blades, said shroud serving to deflect air from the rotor blade tips, upper and lower inner shroud members on opposite sides of said rotor and spaced inwardly from said outer shroud, the annular passageway formed between said inner shrouds and said outer shroud being of relatively large inside diameter and short length, a set of stationary radial blades above said rotor and providing a tangential flow component in a direction opposite the direction of rotor rotation, a set of stationary radial blades below said rotor positioned to substantially remove tangential velocity components in the air leaving the rotor blades, said sets of stationary blades being secured between said inner and outer shrouds, a set of parallel blades above said upper stationary blades and disposed normal to the flight path, and a set of parallel blades below said lower stationary blades and disposed normal to the flight path, said parallel blades being pivotally supported between said inner and outer shrouds.

References Cited in the file of this patent

UNITED STATES PATENTS

| 1,046,385 | Hawes | Dec. 3, 1912 |
| 1,402,539 | Ross | Jan. 3, 1922 |
| 1,440,242 | Porter | Dec. 26, 1922 |
| 1,449,100 | Hall | Mar. 20, 1923 |
| 1,463,694 | Hamel | July 31, 1923 |
| 1,609,978 | Wagner | Dec. 7, 1926 |
| 1,907,394 | Van Vactor | May 2, 1933 |
| 2,377,835 | Weygers | June 5, 1945 |
| 2,461,435 | Neumann | Feb. 8, 1949 |
| 2,567,392 | Naught | Sept. 11, 1951 |

FOREIGN PATENTS

| 515,469 | Great Britain | Dec. 6, 1939 |